United States Patent [19]
Ito et al.

[11] 4,350,229
[45] Sep. 21, 1982

[54] DISC BRAKE HAVING A SLIDABLY SUPPORTED CALIPER

[75] Inventors: Hiroshi Ito; Kazuo Saito, both of Kawasaki, Japan

[73] Assignee: Tokico Ltd., Kanagawa, Japan

[21] Appl. No.: 197,327

[22] Filed: Oct. 15, 1980

[30] Foreign Application Priority Data

Oct. 20, 1979 [JP] Japan .................. 54-145233[U]

[51] Int. Cl.³ ............................................. F16D 65/00
[52] U.S. Cl. ............................... 188/73.45; 188/73.32; 188/73.39
[58] Field of Search ............... 188/73.45, 73.44, 73.39, 188/73.32, 73.33, 73.34, 205, 206, 73.1

[56] References Cited

U.S. PATENT DOCUMENTS

| | | | |
|---|---|---|---|
| 4,019,610 | 4/1977 | Hirai | 188/73.45 |
| 4,061,209 | 12/1977 | Gee et al. | 188/73.45 X |
| 4,139,082 | 2/1979 | Edwards et al. | 188/73.32 |

FOREIGN PATENT DOCUMENTS

| | | | |
|---|---|---|---|
| 2804977 | 8/1979 | Fed. Rep. of Germany | 188/73.45 |
| 1362688 | 4/1964 | France | 188/73.45 |

*Primary Examiner*—Douglas C. Butler
*Attorney, Agent, or Firm*—Wenderoth, Lind & Ponack

[57] ABSTRACT

A disc brake comprising a holder secured to a nonrotatable part of a vehicle, a first pin secured to the holder and extending in the opposite direction therefrom with one end portion straddling the circumference of a rotatable disc, a second pin secured to the holder and extending in the direction separating from the disc, a pair of friction pads on the opposite sides of the disc, a caliper slidably supported on the second pin and the other end portion of the first pin, and a third pin mounted on the caliper and spaced from the first pin in the direction of the circumference of the disc and supporting one ends of the friction pads, the other end of at least one of the friction pads being slidably supported on the first pin. The present invention enables reduction of the size and the weight of the holder. Further, the pad replacing operation can easily be performed without releasing the connection between the caliper and the holder.

8 Claims, 6 Drawing Figures

DISC BRAKE HAVING A SLIDABLY SUPPORTED CALIPER

BACKGROUND OF THE INVENTION

This invention relates to a disc brake and, particularly to a disc brake of the kind including a holder secured to a non-rotatable part of a vehicle and provided on one side of a rotatable disc, two guide pins secured to the holder, a caliper slidably supported on the guide pins and straddling the circumference of the disc, a pair of friction pads provided on opposite sides of the disc, and a brake actuating mechanism incorporated in the caliper for pressing one of friction pads against one side surface of the disc and displacing the caliper thereby pressing the other friction pad against the other side surface of the disc.

Conventionally, the two guide pins secured to the holder are spaced in the direction of the circumference of the disc such that respective guide pins straddle the circumference of the disc and the guide pins are utilized to slidably support the other friction pad thereby receiving the braking torque therefrom. And, with the viewpoint of the strength, the holder has a generally U-shaped configuration as viewed in the direction of the axis of the disc with the size and the weight of the holder being increased.

Further, in replacing the friction pads, one of the pins is removed from the holder and the caliper is rotated around the other pin. Thus, the pad replacing operation is troublesome and time consuming and, further, it requires a relatively large space on the outer circumference of the disc.

SUMMARY OF THE INVENTION

This invention relates to improvements of the disc brake of the aforementioned kind and, according to the invention, one of the guide pins or a second pin slidably supporting the caliper extends from the holder only in the direction separating from the disc, and a third pin is mounted on the caliper at the location spaced from the other guide pin or a first pin in the direction of the circumference of the disc.

Preferably, the second pin is located radially inwards of the first and third pins and, thus, one of the limbs of the U-shaped conventional holder may be omitted thereby decreasing the size and weight of the holder.

BRIEF DESCRIPTION OF THE DRAWINGS

The invention will further be explained with reference to the attached drawings illustrating a preferred embodiment of the invention, in which.

DETAILED DESCRIPTION OF THE PREFERRED EMBODIMENT

Figure 1:
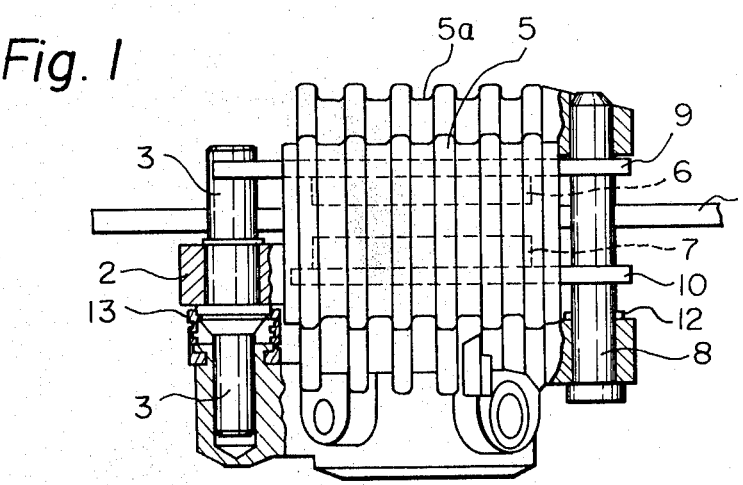
FIG. 1 is a partially sectional plan view of a disc brake according to the invention.

The disc brake shown in the drawings comprises a holder 2 provided on one side (the right side as viewed in FIG. 4) of a rotatable disc 1, and the holder 2 is adapted to be secured to a non-rotatable part (not shown) of a vehicle. A first guide pin 3 and a second guide pin 4 are secured to the holder 2 to extend in the direction of the axis of the disc 1. The first guide pin 3 extends from the holder 2 in the opposite directions. One end portion of the first pin straddles the circumference of the disc 1 to extend to the other side of the disc 1, and the second guide pin 4 extends toward but does not reach the disc 1. A caliper 5 is slidably supported on the second pin 4 and on the other end portion of the first pin 3.

Figure 5:
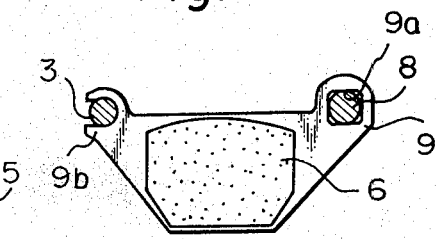
FIGS. 5 and 6 are views showing the positional relationship between guide pins and friction pads.
Figure 6:
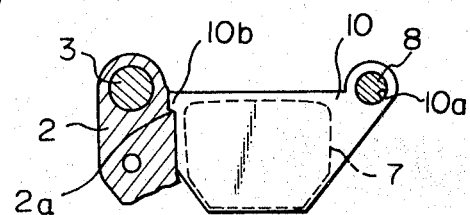

First and second friction pads 6 and 7 having respectively backing plates 9 and 10 are disposed on the opposite sides of the disc 1. A third guide pin 8 is secured to the caliper 5 and is spaced from the first guide pin 3 in the direction of the circumference of the disc 1. The friction pads 6 and 7 are slidably supported on the guide pin 8, such that the guide pin 8 slidably passes through openings 9a and 10a respectively formed in the upper right portions of the backing plates 9 and 10, as shown in FIGS. 5 and 6. Further, the backing plate 9 of the friction pad 6 is bifurcated in its upper left portion 9b for slidably receiving the first guide pin 3 as shown in FIG. 5, and the backing plate 10 of the friction pad 7 has a projection 10b at its upper left portion which is slidably received on a guiding shoulder 2a formed on the holder 2. The guiding shoulder 2a may be replaced by a guiding groove opening in the circumferentially inward direction. The caliper 5 incorporates a brake actuating mechanism including a piston 11 and a cylinder 16. The lower half of the bifurcated portion 9b may be omitted if desired, whereby the backing plate 9 slidably engages with the upper and the right side surface of the pin 3, as viewed in FIG. 5.

Figure 2:
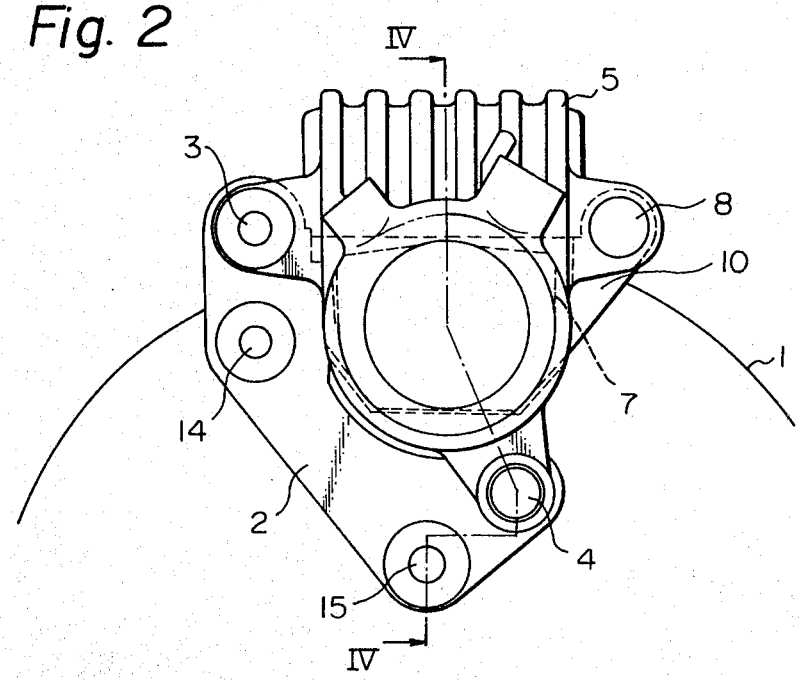
FIG. 2 is a front view of the disc brake of FIG. 1.
Figure 3:
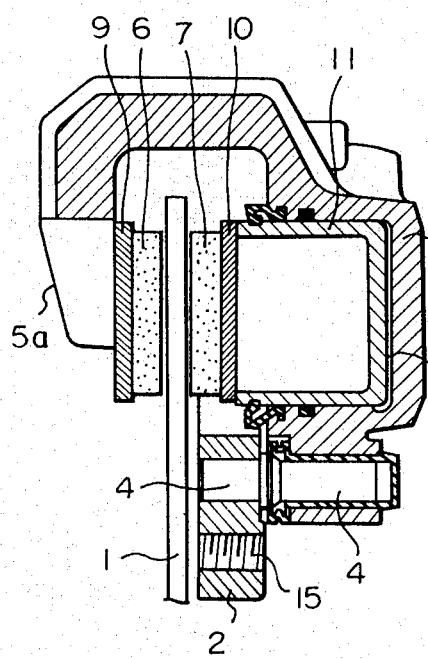
FIG. 3 is a rear view of the disc brake of FIG. 1.

The positional relationship between the first, second and third guide pins 3, 4 and 8 is, as seen in FIGS. 2 and 3, such that the first and third guide pins 3 and 8 are located on the opposite sides of the caliper 5 in the direction of the circumference of the disc and on the radially outward of the circumference of the disc, and that the second guide pin 4 is between and radially inwards of the first and third guide pins 3 and 8 so that the pins 3, 4 and 8 make a equilateral or a bilateral triangle. Thus, the holder 2 has a generally L shaped configuration as viewed in FIGS. 2 and 3. As compared with prior art disc brakes, the portion of the holder of conventional disc brakes surrounding the guide pin corresponding to guide pin 8 and the lower side of the guide pin 8 has been removed. Therefore, it is possible to substantially reduce the size and the weight of the holder.

In the embodiment, the opposite ends of the guide pin 8 are supported on the caliper 5, and the guide pin 8 can be retracted from the caliper 5 in replacing the friction pads 6 and 7. A retaining pin 12 engages with the guide pin 8 and the caliper 5.

In the drawings, shown at 13 is a dust boot, and at 14 and 15 are openings for securing the holder 2 to a non-rotatable part of a vehicle.

In operation, when oil under pressure is supplied to the cylinder 16 by depressing a brake pedal (not shown), the piston 11 presses the friction pad 7 against the disc 1, and the reaction force acting on the piston 11 displaces the caliper 5 and an arm portion 5a thereof presses the friction pad 6 against the disc 1.

In replacing the friction pads 6 and 7, the guide pin 8 is extracted from the caliper 5. Then, the friction pads 6 and 7 can easily be removed by displacing the friction pads in the rightward direction or in the right and downward direction as viewed in FIGS. 2, 5 and 6. The pad replacing operation can be performed very easily without removing any guide pins connecting the caliper with the holder.

Figure 4:
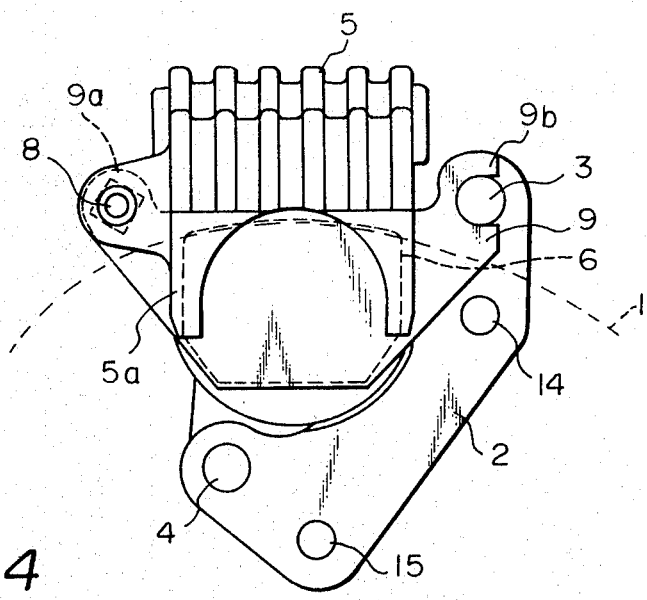
FIG. 4 is a sectional view taken along line IV—IV in FIG. 2.

It will be noted that a pad spring (not shown) is provided between the caliper 5 and the friction pads 6 and 7 so as to urge the friction pads in the forward direction as viewed in FIG. 4.

Although the invention has been described with respect to a preferred embodiment, some changes or modifications may be applied within the technical scope of the invention. For example, the friction pads 6 and 7 may be supported on the first and third pins 3 and 8. Alternatively, the friction pad 7 may be supported on the first and third pins 3 and 8 with the friction pad 6 being supported on the holder 2 and the pin 8.

What is claimed is:

1. A disc brake comprising:
   a rotatable disc having an axis of rotation; a holder provided on one side of said disc and securable to a non-rotatable part of a vehicle;
   a first pin secured to said holder and extending in the direction of said axis, said first pin being located outside the outer circumference of said disc;
   a second pin secured to said holder and extending parallel said first pin and being located radially inwards of the outer circumference of said disc;
   a first friction pad disposed on one side of said disc;
   a second friction pad disposed on the other side of said disc, each of said first and second pads having first and second ends spaced circumferentially along the circumference of said disc;
   a caliper slidably supported on said holder by said first and second pins; and
   a third pin mounted on said caliper and parallel with said first and second pins, said third pin being located outside of the outer circumference of the disc, said first ends of said first and second friction pads each being slidably supported on said third pin, and said second ends of at least one of said first and second friction pads being slidably supported on said first pin.

2. A disc brake as set forth in claim 1 wherein said second end of said first friction pad is slidably supported on said holder.

3. A disc brake as set forth in claim 2 wherein said second end of said second friction pad slidably engages the radially outer surface and the circumferentially inner surface of said first pin.

4. A disc brake as set forth in claim 3 wherein said second end of said second friction pad is bifurcated to slidably engage said first pin.

5. A disc brake as set forth in claim 1 wherein said caliper incorporates a brake actuating mechanism for pressing said first friction pad against said disc and displacing said caliper along said first and second pins thereby pressing said second friction pad against said disc.

6. A disc brake as set forth in claim 1 wherein said second pin is located radially inwards of said first and third pins.

7. A disc brake as in claim 1 wherein said holder extends outside the circumference of said disc only at said first pin.

8. A disc brake as in claim 1 or claim 7 wherein said third pin is spaced from said holder, mounted only to said caliper, said first and third pins comprising the only pins upon which said first and second friction pads are slidable and said first and second pins being the only pins upon which said caliper is slidable.

* * * * *